United States Patent
Babbar et al.

(10) Patent No.: US 11,039,146 B2
(45) Date of Patent: Jun. 15, 2021

(54) VISUAL ARTIFACT DETECTOR

(71) Applicant: ARRIS Enterprises LLC, Suwanee, GA (US)

(72) Inventors: Gautam Babbar, Philadelphia, PA (US); Wayne D Woodruff, Chalfont, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/909,938

(22) Filed: Mar. 1, 2018

(65) Prior Publication Data
US 2019/0273925 A1 Sep. 5, 2019

(51) Int. Cl.
*H04N 19/00* (2014.01)
*H04N 19/154* (2014.01)
*H04N 19/176* (2014.01)
*H04N 19/162* (2014.01)
*G06N 3/08* (2006.01)

(52) U.S. Cl.
CPC ............ *H04N 19/154* (2014.11); *G06N 3/08* (2013.01); *H04N 19/162* (2014.11); *H04N 19/176* (2014.11)

(58) Field of Classification Search
CPC ...... G06K 9/36; H04N 19/172; H04N 19/132; H04N 19/14; H04N 19/587; H04N 19/85; H04N 19/86; H04N 19/90; H04N 19/59; H04N 19/625
See application file for complete search history.

(56) References Cited

U.S. PATENT DOCUMENTS

| 2009/0252431 | A1* | 10/2009 | Lu | H04N 19/172 |
| | | | | 382/255 |
| 2018/0343449 | A1* | 11/2018 | Amer | H04N 19/117 |
| 2019/0075301 | A1* | 3/2019 | Chou | H04N 19/159 |

OTHER PUBLICATIONS

Mathieu et. al Deep Multi-Scale Video Prediction Beyond Mean Square Error, Published as a conference paper at ICLR 2016.*
Gastaldo et al Neural networks for the no-reference assessment of perceived quality, Journal of Electronic Imaging 14(3), 033004 (Jul.-Sep. 2005).*
Hasan et al. "Measuring Blockiness of Videos Using Edge Enhancement Filtering", Signal Processing, Image Processing and Pattern Recognition. SIP 2011. Communications in Computer and Information Science, vol. 260. Springer, Berlin, Heidelberg, 2011.*

* cited by examiner

*Primary Examiner* — Frank F Huang
(74) *Attorney, Agent, or Firm* — Buchanan Ingersoll & Rooney PC (57) ABSTRACT

A method is presented for detecting visual artifacts such as macroblocking artifacts appearing in a rendering of a video stream. A decoded video stream that includes a plurality of frames is received. Edges appearing in the plurality of frames are detected and data characterizing the edges is directed to a neural network. The neural network determines a likelihood that a macroblocking artifact occurs in the video stream using the neural network. The neural network is trained using training data that includes (i) one or more video sequences having known macroblocking artifacts whose size and duration are known and (ii) user ratings indicating a likelihood that users visually perceived macroblocking in each of the one or more video sequences when each of the one or more video sequences are rendered.

9 Claims, 5 Drawing Sheets

_VISUAL ARTIFACT DETECTOR_

BACKGROUND

Service providers, such as cable television providers and satellite television providers, typically make a large number of multimedia channels available to viewers. In an effort to ensure a quality viewing experience, service providers monitor the provision of the multimedia channels to the viewers to identify any problems that may arise in the provision of the multimedia channels. Whenever video that has been encoded is transported over a medium the end user may see video artifacts that are rendered when the video is decoded and presented on a display. These visual video artifacts may be a result of data loss during transmission, errors occurring during encoding or decoding, etc. While some of these video artifacts will be observed by the end user, others will be spatially or temporally too small to be observed.

In some cases service providers employ personnel who repeatedly scan through each video stream that is distributed to confirm that they are being properly provisioned. In addition to requiring a significant number of personnel due to the large number of multimedia channels provided, a significant time period can lapse between scans of the same channel. Alternatively, some service providers employ automated detectors that are situated at various locations within the service provider's network and which are used to detect video artifacts.

SUMMARY

In accordance with one aspect of the subject matter described herein, a method is presented for detecting macroblocking artifacts appearing in a rendering of a video stream. In accordance with the method, a decoded video stream that includes a plurality of frames is received. Edges appearing in the plurality of frames are detected and data characterizing the edges is directed to a neural network. The neural network determines a likelihood that a macroblocking artifact occurs in the video stream using the neural network. The neural network is trained using training data that includes (i) one or more video sequences having known macroblocking artifacts whose size and duration are known and (ii) user ratings indicating a likelihood that users visually perceived macroblocking in each of the one or more video sequences when each of the one or more video sequences are rendered.

In accordance with another aspect of the subject matter described herein, a system for detecting visual artifacts appearing in a rendering of a video stream is presented. The system includes an extractor, transformer and loader (ETL) for obtaining information appearing in a plurality of frames of a decoded video stream. The information is indicative of one or more visual artifacts. The system also includes a neural network receiving the information from the ETL, the neural network using the information to determine a likelihood that a visual artifact occurs in the video stream, the neural network being trained using training data that includes (i) one or more video sequences having known visual artifacts whose characteristics are known and (ii) user ratings indicating a likelihood that users visually perceived visual artifacts in each of the one or more video sequences when each of the one or more video sequences are rendered.

DETAILED DESCRIPTION

A wide variety of video artifacts may arise when visually rendering a video stream. One way to classify such artifacts is based on how the artifacts appear on a display. For example, in one classification scheme, an artifact may be classified as a macroblock, tiling, a black screen, a frozen screen, and so on. Macroblocking is a video artifact in which objects or areas of a video image appear to be made up of abnormal squares defined by sharp edges and lack proper detail and smooth edges. Macroblocking, as well as other visual artifacts, may be caused, for example, by issues concerning the video compression process, the data transfer speed, signal interruption, or the video decoding process.

As detailed below, an automated system and method is presented herein for detecting macroblocks or other visual artifacts in a video stream without the need for comparing the video to a known good reference video. In contrast, conventional methods for detecting visual artifacts typically use a reference video to detect video artifacts. The method presented herein employs a neural network to analyze the video frames in the video stream. Among other advantages, the use of a neural network allows the system to be trained and modified if the end user capabilities, decoder properties or the renderer were to change. For instance, while in one example the system may be trained for video having a resolution of 1080i that is decoded using an MPEG2 decoder and presented to a specific group of end users, the system can be readily trained to detect visual artifacts in a different environment (e.g., video having a different resolution or number of frames per second, video decoded using a different decoding protocol, etc.).

Figure 1:
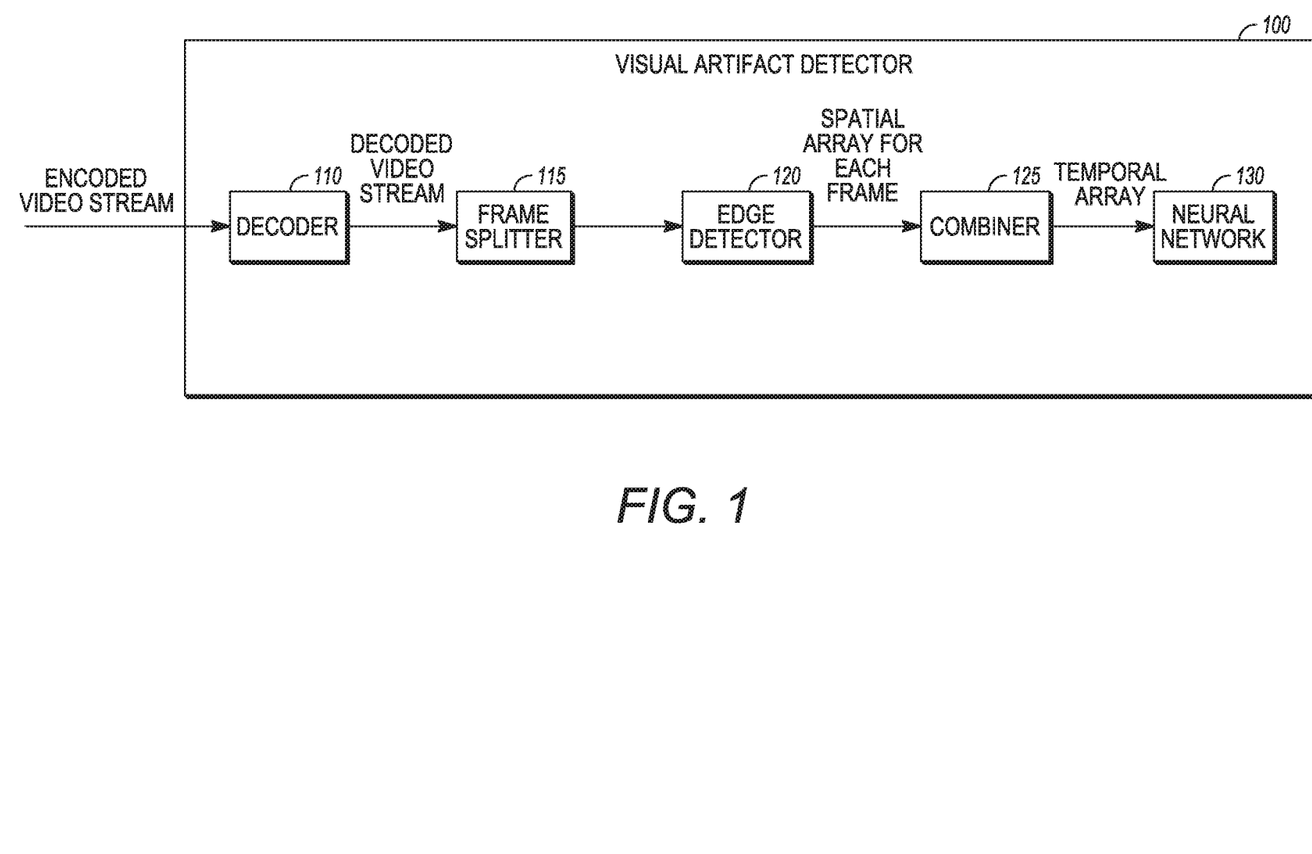
FIG. 1 is a block diagram of one example of a visual artifact detector.

FIG. 1 is a block diagram of one example of a visual artifact detector 100. The detector 100 includes a video decoder 110, a frame splitter 115, an edge detector 120 and a neural network 130. The video decoder 110 receives an encoded video stream that is encoded using any suitable technique, such as those described in the standards defined by MPEG-2, MPEG-4, ITU-T H.263 or ITU-T H.264/MPEG-4, Part 10, Advanced Video Coding (AVC), and extensions of such standards, for example. The video stream that is encoded is typically provided as a series of individual frames that are themselves typically organized as a spatial array of pixels.

The video decoder 110 outputs a decoded video stream that is directed to the frame splitter 115, which sends each frame in the decoded video stream to the edge detector 120. The edge detector 120 is used to detect sharp, straight edges in each frame of the decoded video stream. Edge detection techniques are well-known and thus need not be discussed in detail. In general, any suitable edge detection technique may be used including, without limitation, a Sobel method, a Prewitt method, a Roberts method, a Laplacian or Gaussian method, a zero-cross method and a Canny method.

Once the edges in a given video frame have been detected they are combined to determine which ones form rectangles. The rectangles are potential macroblocks that may be indicative of a macroblocking artifact. Each rectangle may be characterized by an element in a spatial array that defines a starting point of the rectangle (typically a pixel at one corner of the rectangle) and a length and width of the rectangle as measured in units of pixels. That is, the analysis of each frame may result in an array of the form:

spatialArray (starting_Point_of_Rectangle, length, width)

Essentially, each frame is represented by a 3×n array or spatial array [3][n], where n represents the number of rectangles detected. It should be noted, of course, that while this representation of the array is suitable when the visual artifact is a macroblock, different types of arrays may be employed when detecting different types of visual artifacts.

For instance, if the frame is considered on an x-y plane where the coordinates are based on the pixels in the frame, the starting_Point_of_Rectangle is the x,y coordinate of e.g., the upper left corner of the rectangle. The length and width variables are the length and width of the rectangle in pixels.

Conventional macroblocking detection techniques are sometimes based on the spatial array. However, this is not a good representation of macroblocking since even a large macroblock that only occurs for a short period of time may not be visible to the end user and hence may not represent an artifact that seriously degrades the quality of the video. To account for this the macroblocks that occur in a video frame may be characterized by a temporal array of the form:

temporalArray (spatialArray, frameNumber)

This temporal array is a culmination of all macroblocks found in every frame in the video stream. In one embodiment, the temporal array is provided by the edge detector 120 to the neural network processor 130.

Figure 2:
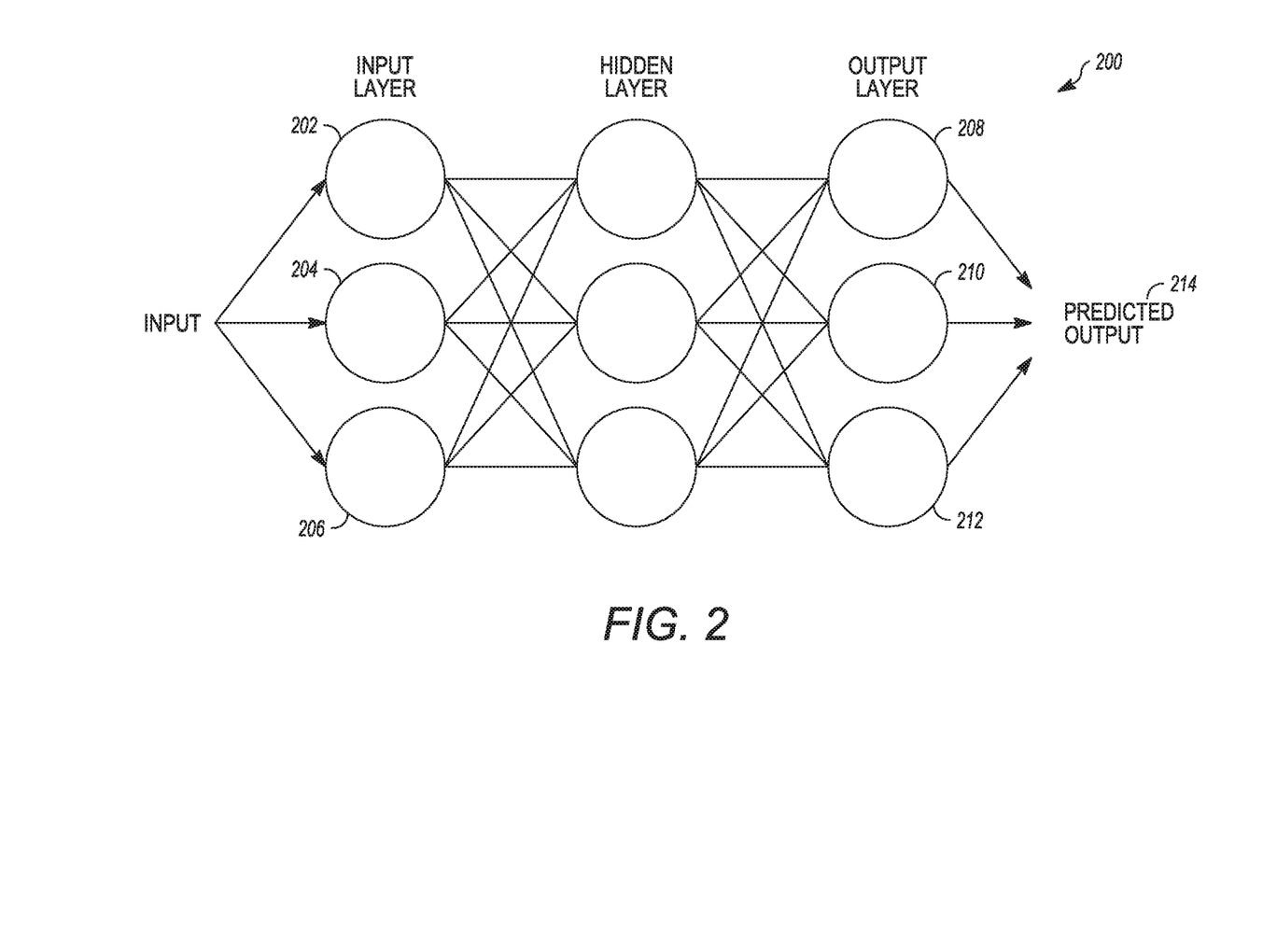
FIG. 2 illustrates an example of a neural network.

FIG. 2 illustrates an example of a neural network 200. A neural network is a mathematical model that replicates how neurons and synapses within a biological neural network function. Through a series of learning exercises, a neural network can learn linear and non-linear relationships that yield a desired behavior or performance of the neural network based on certain inputs.

Neural networks are comprised of neuron and synapses forming an interconnected assembly where neurons are linked to other neurons through synapses, each connection requiring one synapse. Weights are associated with synapses. A node within the neural network receives inputs from all of the synapses connected to the particular node, with the input from a particular synapse weighted by the weight associated with the particular synapse. An activation function may then be used to compute the output of the particular node based on the value of the inputs from the synapses. The output of the particular node may then be fed as the input to one or more nodes in the following layer of the neural network.

The illustrative neural network shown in FIG. 2 has one input layer, one hidden layer, and one output layer. The input layer includes three nodes: first input node 202, second input node 204, and third input node 206. Likewise, the neural network 200 has three nodes in the output layer: first output node 208, second output node 210, and third output node 212. While the embodiment shown in FIG. 2 has three layers that each have three nodes, more generally the neural network may include any number of layers each with any number of nodes. Moreover, the number of nodes in the layers of the neural network need not be the same. The number of input and output nodes may be based on the problem being solved and on the representation of the data used to train the neural network. The number of nodes in the hidden layer also depends on the problem being solved, and may also be determined empirically by analyzing how the performance of the neural network varies based on the number of nodes in the hidden layer.

The neural network 200 shown in FIG. 2 is fully connected, meaning that every node in a layer is connected to every node from the previous layer, and every node is connected to every node in the following layer. For example, the first node in the input layer is connected to each of the three nodes in the hidden layer. Similarly, the second node and the third node in the input layer are connected to each of the three nodes in the hidden layer. It is noted that embodiments are not limited to using a fully connected neural network. The actual architecture for the neural network used may be determined based on the number of inputs and through analysis of the performance of the neural network during the training phase. For instance, an alternative architecture for the neural network may include nodes in a first layer being connected to every other node in the following layer.

The number of hidden layers may also be varied to achieve the desired performance of the neural network. Embodiments of the neural network may also include recurrent links, where a node is connected to another node in the same layer or connected to a node in a previous layer.

The use and training of neural networks is well known in the art. In this particular situation, when training the neural network, the neural network first receives as input the data from the edge detector (e.g., the temporal array) for a training set of video sequences that have been manually examined by a group of end users. The video sequences in the training set include macroblocks whose size and duration and known in advance. The end users rate each video sequence as to the likelihood that macroblocking has been observed. The desired output from the neural network for each video sequence in the training set will ideally match a statistical measure (e.g., an average, mean, etc.) of the end user ratings of the video sequences.

The output from the neural network initially may be very far from the desired output. The actual output of the neural network is compared with the desired output (as determined from the user ratings), and the weights of the synapses of the neural network are updated to make the actual output of the neural network closer to the desired output. The actual synapses between the nodes in the neural network can also be updated (by deleting synapses or adding synapses) to make the actual output of the neural network closer to the desired output. It is to be understood that embodiments disclosed herein can use supervised learning methods, unsupervised learning methods, and semi-supervised learning methods. For example, a popular supervised learning method for neural networks is backpropagation.

In one embodiment, the desired output from the neural network may be a binary value indicating whether or not macroblocking is likely present in the video sequence. In this case the end user ratings of the training data will also be a binary value indicating whether or not each user believed that macroblocking was observed. In another embodiment, the desired output from the neural network may be a numerical ranking that indicates the likelihood that macroblocking is present. A numerical ranking may be preferable to a binary decision since some end users may perceive macroblocking where others may not. For instance, a video sequence may be ranked from, say, 1 to 3, with 3 indicating that macroblocking is most likely present and 1 indicating that macroblocking is most likely not present (or vice versa). While in general the likelihood of macroblocking may be ranked using any numerical range of values, the following example will be illustrated using a scale having 5 values, denoted by numerals 1-5, where each numerical value is assigned the following meaning:

A value of "1" indicates that no macroblocking is present.

A value of "2" indicates that there is a chance that macroblocking is present.

A value of "3" indicates that some macroblocks were likely seen, but with a probability less than certainty.

A value of "4" indicates that small macroblocks were present.

A value of "5" indicates that macroblocks were definitely present.

The end user values assigned to the training sets indicate the end users' subjective perceptions regarding the likelihood that macroblocks are present. Of course, different scales having values with different meanings may be alternatively employed. As previously mentioned, the video sequences in the training set include macroblocks whose size and duration are known in advance. That is, the temporal array for each video sequence is known in advance. It should be noted that in some embodiments the neural network may be capable of training itself. However, training the neural network without any starting values would take a large amount of computation time. To expedite the process the examples described herein provide the neural network with some starting reference values. In addition, the size of the temporal array may be reduced by providing certain rules that are discussed below. In this way a reduced temporal array may be provided to the neural network, which is assisted with initial seed values.

The macroblocks characterized by these known temporal arrays may be categorized based on their size and duration. For purposes of illustration only, both the size and duration will be divided into three categories as follows:

Macroblock Size

Small—fewer than 300 square pixels
Medium—fewer than 700 square pixels
Large—more than 700 square pixels Macroblock Duration Small—fewer than 10 consecutive frames
Medium—fewer than 20 consecutive frames
Large—more than 20 consecutive frames These values and the various categories have been found to work well for video having a resolution of 1080i. Of course, the optimal values may be different for different resolutions, content and screen size. Of course, more generally, the macroblocks specified by the temporal arrays may be divided into any suitable number of size and duration categories. Moreover, the number of size categories may or may not be equal to the number of duration categories.

Based on this particular categorization scheme, there are 9 possible combinations of size and duration that may be used to characterize each macroblock. Specifically, each macroblock may be assigned to one of the following 9 categories: Small Size, Small Duration (SS); Small Size, Medium Duration (SM); Small Size, Large Duration (SL); Medium Size, Small Duration (MS); Medium Size, Medium Duration (MM); Medium Size, Large Duration (ML); Large Size, Small Duration (LS); Large Size, Medium Duration (LM); and Large Size, Large Duration (LL).

In one embodiment, the raw scores assigned to the training sets of video sequences by the end users may be multiplied by a multiplier that is based on the particular one of the 9 categories to which the known macroblocks are assigned. In general, macroblocks that are smaller in size and/or duration will be assigned a smaller multiplier and macroblocks that are larger in size and/or duration will be assigned a larger multiplier. For instance, Table 1 shows one illustrative multiplier scheme that may be assigned the following multipliers to the various categories.

TABLE 1

| MACROBLOCK SIZE AND DURATION | MULTIPLIER |
| --- | --- |
| Small Size, Small Duration | 0.05 |
| Small Size, Medium Duration | 0.07 |
| Small Size, Large Duration | 1.5 |
| Medium Size, Small Duration | 0.07 |
| Medium Size, Medium Duration | 0.1 |
| Medium Size, Large Duration | 2 |
| Large Size, Small Duration | 1 |
| Large Size, Medium Duration | 2 |
| Large Size, Large Duration | 4 |

Thus, an end user's raw score indicating the likelihood that macroblocking is occurring in a video sequence in the training set may be converted to a weighted score that is weighted based on the size and duration of the known macroblocks in the video sequence. In this way video sequences that are known to contain more prominent macroblocking, as indicated by the presence of macroblocks that are larger in size and/or duration, will be assigned a higher weighted user score than video sequences that are known to contain less prominent macroblocking, as indicated by the presence of macroblocks that are smaller in size and/or duration.

Figure 3:
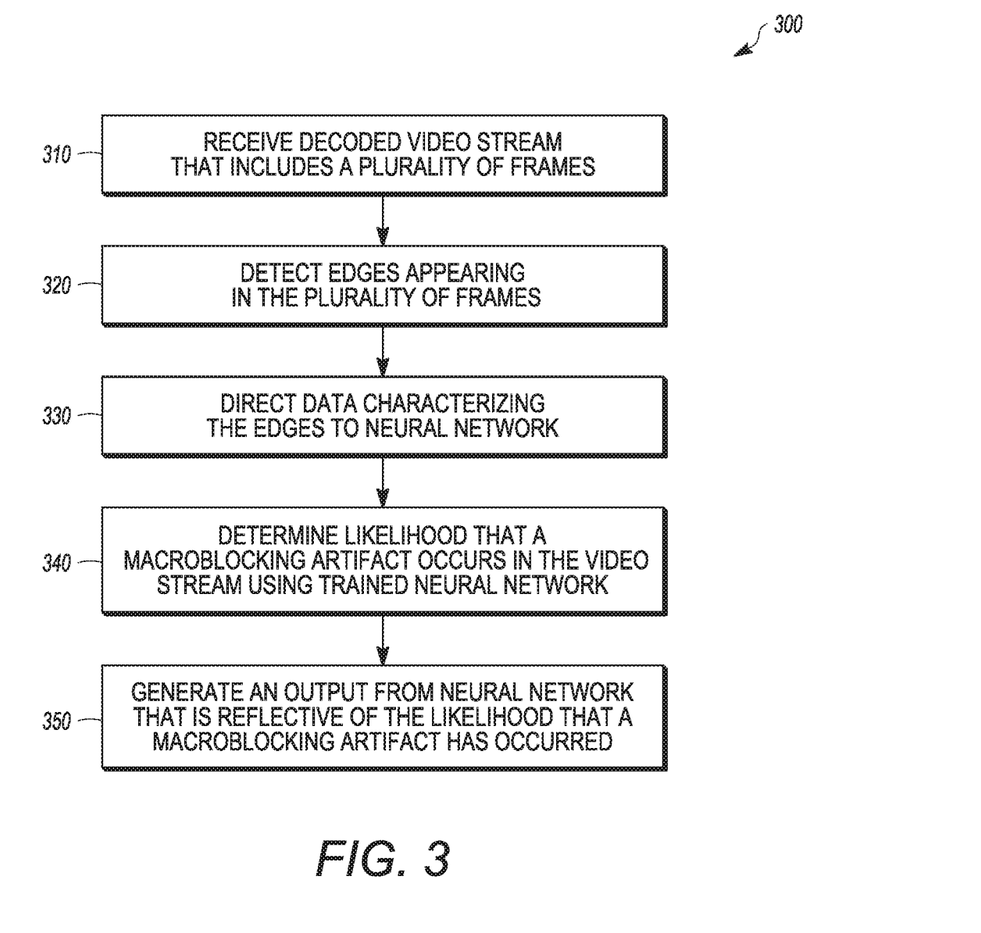
FIG. 3 is a flowchart illustrating one example of a method for detecting macroblocking artifacts appearing in a rendering of a video stream.

Thus, in one embodiment, the neural network can use as training data the edge detection data from edge detector 120 (e.g., the temporal array) and the weighted user data. Once the neural network has been trained, it can be used to determine the likelihood that macroblocking is present in video sequences that do not belong to the training set, i.e., video sequences in which the presence of macroblocking is unknown. FIG. 3 is a flowchart illustrating one example of a method for detecting macroblocking artifacts appearing in a rendering of a video stream. At block 310 a decoded video stream that includes a plurality of frames is received. Edges appearing in the plurality of frames is detected at block 320. Data characterizing the edges is directed to a neural network at block 330. In one embodiment the data characterizing the edges may correspond to the temporal array described above. At block 340, a likelihood that a macroblocking artifact occurs in the video stream is determined using the neural network. The neural network is trained using training data that includes (i) one or more video sequences having known macroblocking artifacts whose size and duration are known and (ii) using user ratings indicating a likelihood that users visually perceived macroblocking in each of the one or more video sequences when each of the one or more video sequences are rendered. In one embodiment the user ratings may be weighted based on the known size and duration of the macroblocking artifacts such that user ratings of macroblocking artifacts that are larger in size and/or duration are given greater weight than macroblocking artifacts that are smaller in size and/or duration. The neural network generates an output at block 350 that is reflective of the likelihood that a macroblocking artifact has occurred.

It is to be understood that embodiments of the visual artifact detection system are not limited to training the neural network a single time. For instance, it may be desirable to re-train the neural network whenever the characteristics of the video stream changes (e.g., when there is a change in resolution, the number of frames per second, the decoding scheme employed, etc.).

Figure 4:
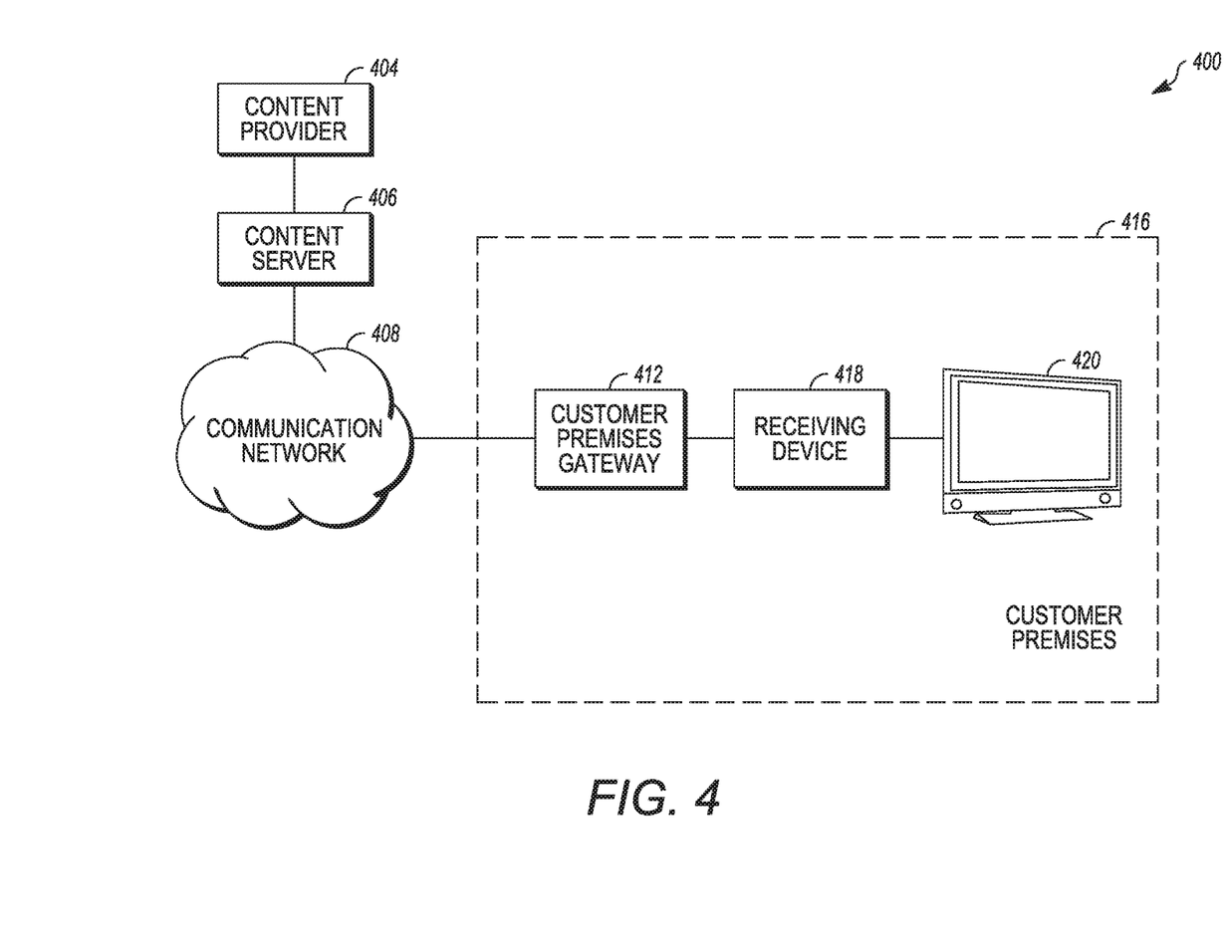
FIG. 4 shows a block diagram of one example of an operating environment in which the visual artifact detection system shown herein may be employed.

FIG. 4 shows a block diagram of one example of an operating environment in which the visual artifact detection system shown herein may be employed. In this example the operating environment is an illustrative content distribution system 400 in which audio, video, and/or data service providers, such as television or streaming media service providers, provide their customers a multitude of video and/or data content. Such content may be provided to a customer premises gateway 412 located at the customer premises 416. A receiving device 418 is operatively coupled to receive the content from the customer premises gateway 412.

The customer premises gateway 412 interconnects to one or more communications media or sources (such as a cable head-end, satellite antenna, telephone company switch, Ethernet portal, off-air antenna, content server, or the like) that provide the programming. The customer premises gateway 412 commonly receives a plurality of programming by way of the communications media or sources described in greater detail below. Customer premises gateway 412 may incorporate any of a variety of different types of network interfaces depending on the type of communications network 408 that is employed. For instance, customer premises gateway 412 may include a fiber optic network interface, a cable modem or other type of network interface.

The customer premises gateway 412 provides the programming to the receiving device 418. Examples of the receiving device 418 may include, but are not limited to, devices such as: a receiver, a television converter, a set-top box, television receiving device, television receiver, television recording device, satellite set-top box, satellite receiver, cable receiver, media player, and a digital video recorder (DVR). Based upon selection by a user, the receiving device 418 processes and communicates the selected programming to the display device 420.

Examples of the display device 420 may include, but are not limited to: a television (TV), a personal computer (PC), a computer monitor, smartphone, mobile device, tablet device, game system, or the like. In some embodiments the receiving device 418 and the display device 420 may be integrated into a single device. Such a single device may have the above-described functionality of the receiving device 418 and the display device 420.

A content provider 404 provides video content to a distributor, which may have or control equipment such as content server 406. In some embodiments the content server 406 may be incorporated in a headend of a content delivery network that delivers video content and possibly other services to subscribers. Content server 406 communicates with customer premises gateway 412 over a communications network 408. The communications network 408 may be a wide area network (WAN) such the Internet or an intranet. As another example, communications network 408 may be a cellular network or a cable data network such as an all-coaxial or a hybrid-fiber/coax (HFC) network. Of course, other types of networks such as xDSL (e.g., ADSL, ADLS2, ADSL2+, VDSL, and VDSL2) and satellite systems may also be employed. In yet other examples the communications network 408 may be a combination of two or more different types of networks.

The visual artifact detection system described herein may be employed to examine a video stream at any point along the path it traverses from the content provider 404 to the display device 420. For instance, in one embodiment the visual artifact detection system may examine the video signal output by the receiving device 418 and which is directed to the display device 120. If, for example, the receiving device 418 is a set top box or the like that outputs a decoded video signal, the visual artifact detection system can examine the signal without the need for the decoder device 110 shown in the example of FIG. 1. On the other hand, if the visual artifact detection system is to examine the video signal at a node or other point along the path between the communication network 408, the visual artifact detection system will generally first need to decode the video signal and hence will require the decoder device 110.

While the visual artifact detection system described herein has been discussed in terms of macroblocking artifacts, more generally it may be employed to detect a wide range of visual artifacts that may appear in a video stream. For instance, visual artifacts such as tiling, a black screen, a frozen screen, and the like may be detected. Depending on the nature of the visual artifact to be detected, the edge detector may be replaced with a suitable detector tailored for that particular visual artifact and which is capable of obtaining information from the video frames that can be used to determine the presence of the visual artifact. For instance, if the artifact is a blank screen, the detector may obtain the luma and chrominance values of the pixels. A similar detector may be used for visual artifacts such as blurriness. For tiling artifacts, an edge detector may once again be employed. In general, in some embodiments the detector may employ an extractor, transformer and loader (ETL) process to extract the required information from the pixels in the video stream and transform it into a spatial array before loading it into the neural network. Each type of visual artifact will have an ETL tool that is specific to that artifact. Moreover, each type of video artifact may need its own neural network configured for that particular visual artifact When training the neural network to determine a likelihood that the training data will include video sequences having video artifacts with known visual artifacts whose characteristics are known. In those embodiments in which the user ratings are weighted, the weights may be based on the known characteristics of the known visual artifacts such that user ratings of known visual artifacts that are more prominent as determined by any suitable objective metric are given greater weight than visual artifacts that are less prominent as determined by that same objective metric.

Figure 5:
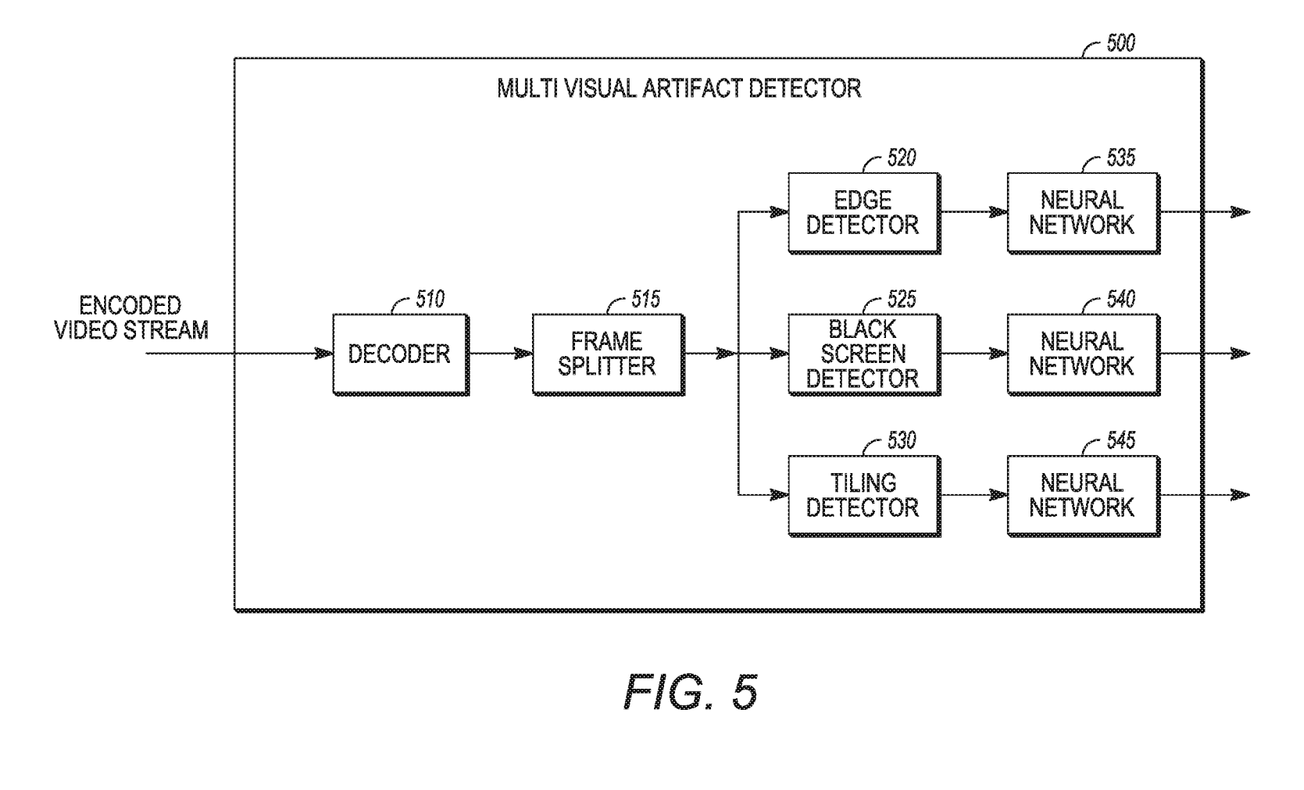
FIG. 5 is a block diagram of one example of a multi-artifact detector.

In some embodiments the visual artifact detector may be a multi-artifact detector system that is able to detect two or more different types of visual artifacts. In this case the neural network may be trained to determine the likelihood that each of the different types of artifacts are present in video streams. Alternatively, such a multi-artifact detector system may employ a dedicated neural network for each type of visual artifact. This is illustrated in the multi-artifact detector system 500 of FIG. 5, which can be used to detect macroblocks, black screens and tiling. In this example the data from the decoder 510 is directed to frame splitter 515, which in turn directs the frames to edge detector 520, black screen detector 525 and tiling detector 530, which in turn respectively direct the extracted information to neural networks 535, 540 and 545.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method for detecting macroblocking artifacts appearing in a rendering of a video stream, comprising:
   training a neural network to determine a likelihood that a macroblocking artifact occurs in a video stream, the training including:
     inputting, into the neural network, one or more video sequences having known macroblocking artifacts whose size and duration are known; and
     inputting, into the neural network, user ratings indicating a likelihood that users visually perceived macroblocking in each of the one or more video sequences when each of the one or more video sequences are rendered;
   receiving a decoded video stream that includes a plurality of frames;
   detecting edges appearing in the plurality of frames;
   providing data characterizing the detected edges to the trained neural network, the data indicating a potential macroblocking artifact;
   determining a likelihood that a macroblocking artifact occurs in the video stream using the trained neural network based on the data; and
   generating an output based on the determined likelihood that a macroblocking artifact occurs in the video stream, the output including a ranking value selected from a scale of values such that increasing or decreasing values in the scale of values represent a greater likelihood that a macroblocking artifact is present, the scale of values including three or more values.

2. The method of claim 1, comprising:
   the user ratings are weighted based on the known size and duration of the known macroblocking artifacts such that user ratings of macroblocking artifacts that are larger in size and/or duration are given greater weight than macroblocking artifacts that are smaller in size and/or duration.

3. The method of claim 1,
   the output further includes a binary output having a first value indicating that a macroblocking artifact is likely present or a second value indicating that a macroblocking artifact is likely not present.

4. The method of claim 1, further comprising periodically retraining the trained neural network.

5. The method of claim 4, where retraining the trained neural network includes retraining the trained neural network when at least one characteristic of the decoded video stream changes.

6. The method of claim 5, comprising:
   the at least one characteristic of the decoded video stream is selected from the group consisting of resolution, number of frames per second and a decoding protocol used to decode the decoded video stream.

7. The method of claim 1, the data indicating a potential macro blocking artifact is one or more rectangles.

8. The method of claim 7, the one or more rectangles are characterized by an element in a spatial array, the spatial array defining a starting point, a length, and a width of the rectangle.

9. The method of claim 7, the one or more rectangles are characterized by a temporal array, the temporal array containing a spatial array and a frame number for each of the one or more rectangles, the spatial array defining a starting point, a length, and a width of the rectangle.

* * * * *